United States Patent
Zhang et al.

(10) Patent No.: US 7,773,341 B2
(45) Date of Patent: Aug. 10, 2010

(54) LAMINATED FILM FOR HEAD APPLICATIONS

(75) Inventors: Kunliang Zhang, Milpitas, CA (US); Min Zheng, Milpitas, CA (US); Min Li, Dublin, CA (US); Chen-Jung Chien, Sunnyvale, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 635 days.

(21) Appl. No.: 11/825,034

(22) Filed: Jul. 3, 2007

(65) Prior Publication Data

US 2009/0009907 A1    Jan. 8, 2009

(51) Int. Cl.
*G11B 5/33* (2006.01)
(52) U.S. Cl. .................... 360/125.11
(58) Field of Classification Search ........ None
See application file for complete search history.

(56) References Cited

U.S. PATENT DOCUMENTS

| | | | |
|---|---|---|---|
| 5,862,021 A | 1/1999 | Deguchi et al. | |
| 6,452,763 B1 | 9/2002 | Gill | |
| 6,667,850 B2* | 12/2003 | Khan et al. | 360/125.5 |
| 6,795,273 B2* | 9/2004 | Minor et al. | 360/125.12 |
| 6,853,518 B2* | 2/2005 | Westwood | 360/317 |
| 7,019,943 B2* | 3/2006 | Sato | 360/125.71 |
| 7,057,853 B2 | 6/2006 | Okada et al. | |
| 7,057,861 B2* | 6/2006 | Asatani et al. | 360/324.12 |
| 7,057,865 B1 | 6/2006 | Mao et al. | |
| 7,173,797 B2 | 2/2007 | Sbiaa | |
| 7,214,404 B2 | 5/2007 | Kim | |
| 7,359,151 B1* | 4/2008 | Biesecker et al. | 360/125.01 |
| 7,457,080 B2* | 11/2008 | Watabe et al. | 360/125.12 |
| 7,464,457 B2* | 12/2008 | Le et al. | 29/603.16 |
| 7,595,959 B2* | 9/2009 | Covington et al. | 360/125.02 |
| 7,609,478 B2* | 10/2009 | Han et al. | 360/125.12 |

OTHER PUBLICATIONS

Co-pending U.S. Appl. No. 11/820,962, filed Jun. 21, 2007, "PMR with Improved Writability and Process Controllability by Double Layer Patterning", Assigned to the Same Assignee as the Present Invention.

"High Moment Materials and Fabrication Processes for Shielded Perpendicular Write Head Beyond 200 Gb/in$^2$", by Y. Chen et al., IEEE Trans. on Mag., vol. 43, No. 2, Feb. 2007, pp. 609-614.

(Continued)

*Primary Examiner*—Mark Blouin
(74) *Attorney, Agent, or Firm*—Saile Ackerman LLC; Stephen B. Ackerman (57) ABSTRACT

A laminated main pole layer is disclosed in which a non-AFC scheme is used to break the magnetic coupling between adjacent high moment layers and reduce remanence in a hard axis direction while maintaining a high magnetic moment and achieving low values for Hch, Hce, and Hk. An amorphous material layer with a thickness of 3 to 20 Angstroms and made of an oxide, nitride, or oxynitride of one or more of Hf, Zr, Ta, Al, Mg, Zn, or Si is inserted between adjacent high moment stacks. The laminated structure also includes an alignment layer below each high moment layer within each stack. In one embodiment, a Ru coupling layer is inserted between two high moment layers in each stack to introduce an AFC scheme. An uppermost Ru layer is used as a CMP stop layer. A post annealing process may be employed to further reduce the anisotropy field (Hk).

21 Claims, 3 Drawing Sheets

OTHER PUBLICATIONS

"Optimization of High $B_{sat}$ FeCo Films for Write Pole Applications", by Ming Mao et al., Jrnl. of Applied Physics 97, 10F908-1 to 10F908-3 (2005).

"Single-Pole/TMR Heads for 140-Gb/in$^2$ Perpendicular Recording", by K. Nakamoto et al., IEEE Trans. on Mag., vol. 40, No. 1, Jan. 2004, pp. 290-294.

* cited by examiner

LAMINATED FILM FOR HEAD APPLICATIONS

RELATED PATENT APPLICATION

This application is related to Headway Docket # HT07-005, Ser. No. 11/820,962, filing date Jun. 21, 2007, assigned to the same assignee as the current invention and which is herein incorporated by reference in its entirety.

FIELD OF THE INVENTION

The invention relates to a main pole layer of a PMR writer and a method for making the same wherein the main pole layer is a laminate of a high moment FeCo material and an amorphous material to improve high moment material softness and anisotropy field (Hk), and reduce remanence.

BACKGROUND OF THE INVENTION

Figure 1:
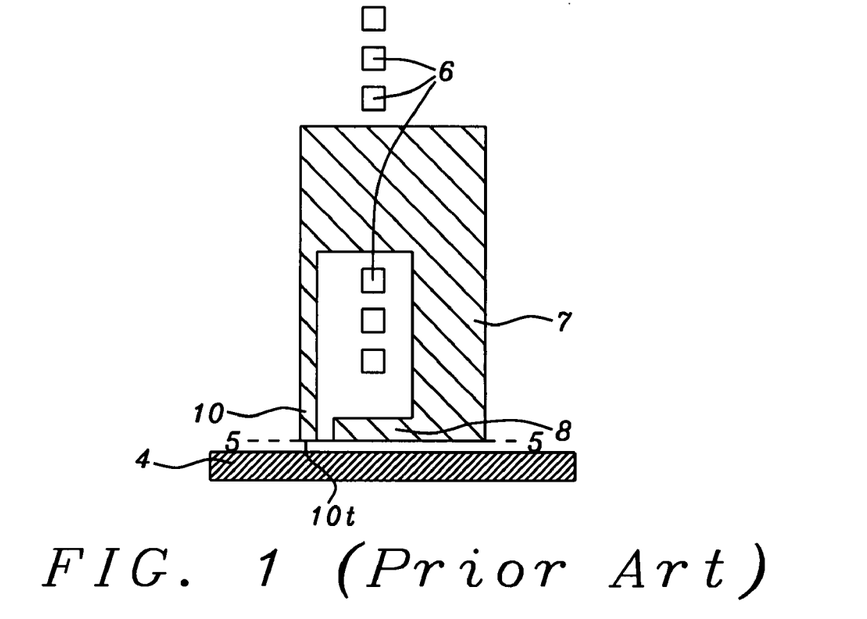
FIG. 1 is a cross-sectional view of a conventional PMR writer showing the main write pole, flux return pole, magnetic recording media, and coils that generate magnetic flux.

Perpendicular magnetic recording (PMR) has become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. Although a PMR head which combines the features of a single pole writer and a soft magnetic underlayer has a great advantage over LMR in providing higher write field, better read back signal, and potentially much higher areal density, PMR still suffers some problems. One of the biggest issues is the head-induced data erasure that is of particular concern since the erasure occurs after writing. This type of erasure is believed to be caused by a remanent magnetization in the main pole layer. A conventional PMR write head as depicted in FIG. 1 typically has a main pole layer 10 or write pole with a pole tip 10$t$ at an air bearing surface (ABS) 5 and a flux return pole (opposing pole) 8 which is magnetically coupled to the write pole through a trailing shield 7. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip 10$t$ at the ABS is high enough to switch magnetizations in the recording media 4. A trailing shield is added to improve the field gradient in the down-track direction.

Figure 2:
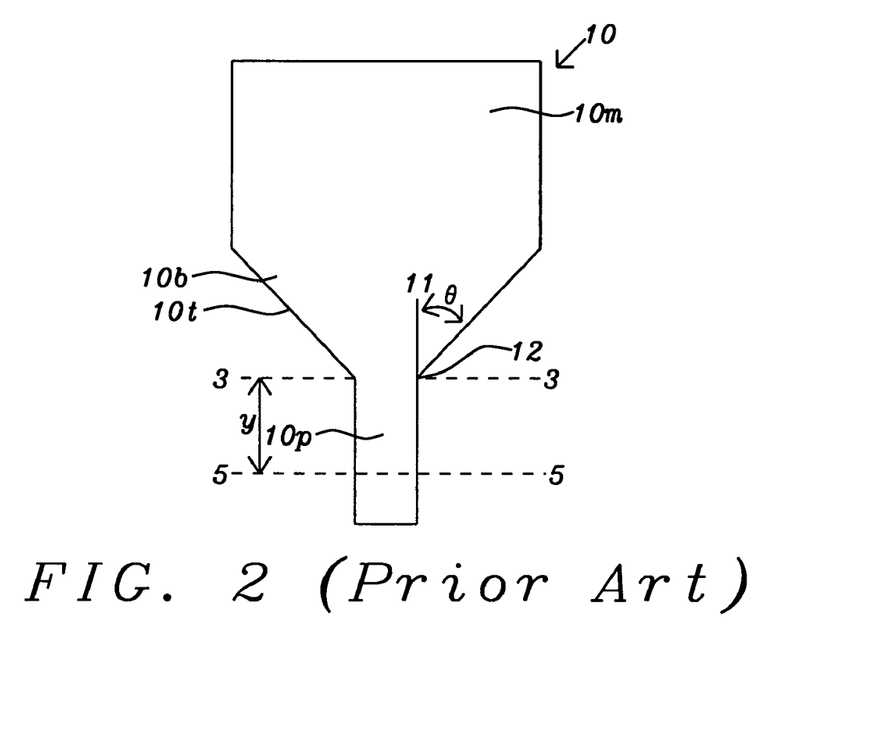
FIG. 2 is a top view showing a main write pole layer of a conventional PMR write head that has a narrow write pole section adjacent to the ABS and a larger yoke section with sides that flare outward at an angle θ from the sides of the narrow write pole.

Referring to FIG. 2, a top view is shown of a typical main pole layer 10 that has a large, wide portion called a yoke 10$m$ and a narrow rectangular portion 10$p$ called a pole that extends a neck height (NH) distance y from the ABS plane 5-5 to a plane 3-3 parallel to the ABS where the pole intersects the yoke at the neck 12. The main pole layer 10 flares outward at an angle θ from a dashed line 11 that is an extension of one of the long rectangular sides of the pole 10$p$. PMR technologies require the pole 10$p$ at the ABS to have a beveled shape (as viewed from the ABS) so that the skew related writing errors can be suppressed.

In the fabrication process, the yoke 10$m$ and pole 10$p$ may be formed by patterning a photoresist layer (not shown) above an alumina layer and then transferring the pattern through the alumina by an etching process to form a mold. An electroplating process or sputter deposition method may be used to deposit a main pole layer 10 that fills the cavity in the alumina. Finally, a lapping process is employed to remove the end of the pole 10$p$ opposite the yoke 10$m$ and thereby define an ABS plane 5-5.

To achieve high areal recording density with PMR technology, key requirements for the PMR writer design are to provide large field magnitude and high field gradient in both down-track and cross-track directions. In practice, these two requirements are often traded off with each other to balance the overall performance. One approach involves optimizing the geometry of the main write pole such as modifying the values for NH and flare angle θ. A short NH or large θ can increase write field magnitude effectively. However, too short of a NH leads to problems of meeting process tolerance during manufacturing while too large of a flare angle θ may cause a large amount of adjacent track erasure because of a large fringe field. In today's commercial PMR writer products, NH is generally greater than 0.1 micron and flare angle θ is kept less than 45 degrees.

A trend in the industry is to increase the recording density and recording frequency which requires a higher saturation magnetic flux density ($B_s$) and higher resistivity (ρ) in the main pole layer than provided by conventional write heads. A low coercivity ($H_c$) is also desirable. A laminated high moment film involving an antiferromagnetic coupling scheme with Ru coupling layers between high moment layers has been described in U.S. Pat. No. 7,057,853 and by Y. Chen et al. in "High moment materials and fabrication processes for shielded perpendicular write head beyond 200 Gb/in$^2$", IEEE Trans. Magn. Vol. 43, No. 2, p 609 (2007). In the laminated scheme, a high moment material such as a FeCo layer is laminated into several thinner FeCo layers that are separated by non-magnetic layer insertions. When a non-magnetic lamination material such as Ru, Rh, or Cr reaches a certain thickness, a coupling energy is generated such that the magnetization of the FeCo layers on either side of a Ru or non-magnetic layer will align in anti-parallel directions thereby establishing an anti-ferromagnetic (AFC) laminated configuration. Since the magnetization in a FeCo layer is oriented opposite to that of the magnetic moment in the nearest FeCo layer, the remanent magnetization can be reduced. However, the AFC coupling strength of a FeCo/Ru/FeCo configuration is typically large and this type of AFC lamination will inevitably cause a large anisotropy field and low magnetic moment under a low field. Although the coupling strength can be lowered by using a thicker Ru of about 18 Angstrom compared with 7.5 Angstroms, the magnetic moment will be diluted as the non-magnetic content in the FeCo/Ru/FeCo stack is increased.

In non-AFC laminations where the lamination scheme does not involve AFC coupling, the reduction of remanent magnetization must be achieved through demagnetization fields. In this case, the FeCo layer is laminated with some non-magnetic material such as Cu or thick Ru. After patterning, the demagnetization fields will force the neighboring FeCo layers to form a closure-like domain structure to effectively reduce remanent magnetization. However, a thick Ru layer results in an undesirable decrease in magnetic moment for the main pole layer while a thicker Cu layer is typically required in order to effectively break the interlayer coupling between two neighboring FeCo layers sandwiched on either side of the Cu layer. Moreover, Cu is typically easy to corrode which is a disadvantage when considering reliability. Examples of non-AFC laminations are described by Min Mao et al. in "Optimization of high Bs FeCo film for write pole applications", JAP 97, 10F908 (2005), and by K. Nakamoto et al. in "Single pole/TMR heads for 140 Gb/in$^2$ perpendicular recording", IEEE Trans. Magn., Vol. 40, p 290 (2004). However, an improved non-AFC lamination structure is needed that fulfills all the requirements of a main pole material including large magnetic moment, small coercivity in both easy axis and hard axis directions, small Hk, and small remanence.

Other related prior art includes the following references. In U.S. Pat. No. 7,214,404, a soft magnetic layer made of a NiFe alloy and at least one of Nb, V, Ta, Zr, Hf, Ti, B, Si, and P is used to reduce the demagnetization energy of an adjacent perpendicular magnetic recording layer in a PMR disk.

U.S. Pat. No. 6,452,763 discloses an inner pinned (AP1) layer with a laminated configuration in which FeCo layers are separated by nano oxide layers such as CoFeO.

U.S. Pat. No. 5,862,021 describes the use of a Co oxide film as a buffer layer below a pinned layer to weaken the magnetic coupling between the pinned layer and a free layer and thereby increase the MR ratio of a magnetoresistive element.

In U.S. Pat. No. 7,173,797, a composite inner pinned layer is employed to increase the MR ratio in a CPP type head and is comprised of a stack represented by FeCo/Cu/ferromagnetic layer/Cu/FeCo where the middle ferromagnetic layer is partially oxidized.

A composite free layer in U.S. Pat. No. 7,057,865 has a CoFe/Ru/CoFe configuration and is formed adjacent to a bias layer made of an antiferromagnetic material. The Ru spacer layer has an appropriate thickness to cause strong anti-parallel coupling in the CoFe free layers.

SUMMARY OF THE INVENTION

One objective of the present invention is to provide a laminated main pole layer with high moment material softness, low Hk, and low remanence that minimizes pole erasure in PMR writer applications.

Another objective of the present invention is to provide a main pole layer according to the first objective while maintaining a high magnetic moment necessary for high areal density recording.

A third objective of the present invention is to provide a method for forming a laminated main pole layer according to the first two objectives that is compatible with current manufacturing process flows and equipment.

These objectives are realized in the present invention by first providing a substrate upon which a mold forming layer has been formed. In one embodiment, an etch stop layer may be formed on the substrate followed by forming an insulation layer on the etch stop layer. A mold for the main pole layer is formed in the insulation layer by a sequence of photoresist imaging and etching steps. In one aspect, a photoresist layer is coated on the insulation layer and patternwise exposed to form an opening in the shape of a main pole layer with yoke and pole sections that uncovers a portion of the insulation layer. Thereafter, the opening is transferred through the insulation layer by a reactive ion etch (RIE) process that stops on the etch stop layer. Optionally, the mold formation sequence may include a first photoresist patterning and etching sequence followed by a second photoresist patterning and etching sequence to define different portions of the opening that correspond to different sections of the main pole layer.

After the photoresist layer is removed, a seed layer may be deposited on the insulation layer and on the etch stop layer within the mold shape. Then a series of sputter deposition steps are performed to fabricate the main pole layer within the mold shape. A key feature is that the main pole layer including the write pole has a laminated structure comprised of a thin amorphous material layer (A) such as an oxide or nitride and a high moment material layer (M) that is FeCo or FeCoNi. Preferably, there is also an alignment layer (B) formed below each M layer that serves to align the magnetization and control the grain structure in the overlying high moment material layer. In one embodiment represented by a [(B/M)/A]$_n$/(B/M)/cap configuration, n is an integer, an amorphous material layer (A) separates each (B/M) stack from a neighboring (B/M) stack, and the cap layer serves as a CMP stop layer on the main pole layer stack. The amorphous material layer may be formed by first depositing an element (Hf) followed by a natural oxidation (NOX), radical oxidation (ROX), or plasma oxidation process to form HfOx, or by depositing HfOx in a sputter deposition process using an oxide target. Alternatively, the amorphous material layer may be comprised of ZrOx, TaOx, AlOx, MgOx, ZnOx, SiOx, or one or more combinations of the aforementioned oxides. The present invention also encompasses an embodiment wherein the amorphous material layer is comprised of a nitride such as HfNx or an oxynitride. The amorphous material layer is employed to break the exchange coupling between neighboring CoFe layers so as to reduce the remanent magnetization in the resulting main pole layer.

In a second embodiment, the laminated main pole layer may have a configuration represented by [(B/M/B/M)/A]$_n$/(B/M/B/M)/cap in which an amorphous material layer (A) is formed between each (B/M/B/M) stack. In yet another embodiment, a scheme that combines an AFC type of lamination with a non-AFC lamination is achieved with a configuration represented by [(B/M/C/M)/A]$_n$/(B/M/C/M)/cap in which C is a coupling layer such as Ru that establishes antiferromagnetic coupling between the two M layers within each (B/M/C/M) stack while an amorphous material layer (A) formed between each (B/M/C/M) stack generates a non-AFC lamination.

After the laminated main pole layer is formed, one or more annealing processes such as hard axis annealing, easy axis annealing, or combinations of both hard axis and easy axis annealing may be employed. Then a planarization process such as a chemical mechanical polish (CMP) step may be performed to make the top surface of the laminated main pole layer coplanar with the adjacent insulation layer.

DETAILED DESCRIPTION OF THE INVENTION

The present invention is a laminated main pole layer formed in a PMR writer and a method of making the same. Although a top view of the main pole layer is not shown, it should be understood that the yoke section of the main pole layer may have various shapes including a five sided structure as described in Headway patent application HT07-005 which is herein incorporated by reference in its entirety. The present invention also anticipates a yoke shape that is essentially a continuous curved shape and one that has a plurality of sides as observed from a top (down-track) view. Furthermore, the numbered elements in the drawings are not necessarily drawn to scale.

Figure 3:
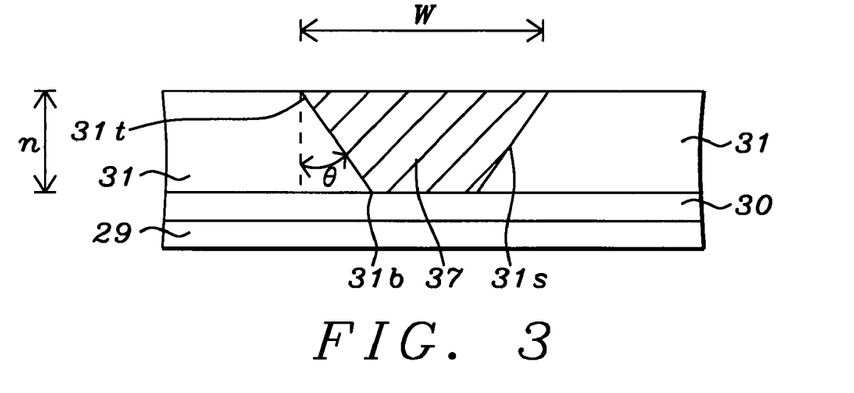
FIG. 3 is a cross-sectional view from an ABS plane of a main pole layer formed within an insulation layer according to an embodiment of the present invention.

Referring to FIG. 3, a view of the write pole tip of a main pole layer 37 formed within an insulation layer 31 according to the present invention is seen from an ABS plane. A substrate 29 is provided that may be comprised of AlTiC, for example. A RIE resistant layer 30 with a thickness of 200 to 1000 Angstroms may formed on the substrate 29 by a sputter deposition or physical vapor deposition (PVD) process, for example, and preferably includes a material such as Ru or NiCr that has a high selectivity relative to an insulating material such as alumina during a subsequent RIE etch that uses $BCl_3$, chlorine, and fluorocarbon gases. Alternatively, the main pole layer 37 may be formed directly on the substrate 29. Above the RIE resistant layer 30 is an insulation layer 31 wherein a mold shape is formed for depositing a main pole layer. The insulation layer 31 may be comprised of $Al_2O_3$ or silicon oxide that is deposited by a PVD process, a sputtering technique, or the like in the same deposition tool as the RIE resistant layer. The insulation layer 31 may also be made of other dielectric materials known in the art and has a thickness equivalent to the desired thickness of the main pole layer to be deposited in a later step.

The main pole layer 37 is formed within an opening or mold (not shown) within the insulation layer 31 that corresponds to the shape of the main pole layer. In particular, the write pole section of the main pole layer 37 has sloped sidewalls 31s wherein the top surface 31t of the pole has a larger width along the ABS plane than the bottom surface 31b. Moreover, the sidewalls 31s are sloped at an angle θ of about 5 to 20 degrees with respect to the plane of the RIE resistant layer 30. The pole has a beveled shape with an angle θ so that the skew related writing errors can be suppressed.

A photoresist patterning and etching sequence for forming a mold in an insulation layer during a main pole layer fabrication has been previously described in Headway application HT07-005. In one embodiment, a first photoresist layer is patterned and etched to form a rectangular shape that corresponds to the write pole section of the main pole layer. The rectangular shape is transferred through the insulation layer by a RIE process comprising $BCl_3$, $Cl_2$, and a fluorocarbon gas to generate a trench with beveled sidewalls. Thereafter, the first photoresist layer is removed and a second photoresist layer is coated on the insulation layer and patterned to form a yoke shape opening that is partially superimposed over the rectangular trench. A second etch process involving $BCl_3$ and $Cl_2$ may be employed to transfer the yoke shape opening through the insulation layer and form essentially vertical sidewalls in the yoke section of the mold for the main pole layer. Optionally, other double photoresist patterning and etching sequences or a single photoresist patterning and etch process may be used to form a mold in the insulation layer 31 for depositing the main pole layer 37. However, a technique is preferred that produces essentially vertical sidewalls in the yoke section of the mold and especially adjacent to the neck (not shown) in order to enable a maximum amount of magnetic material volume in the yoke proximate to the neck. A two mask process for forming a mold as previously disclosed by the inventors in Headway patent application HT07-005 provides an additional advantage of improving dimensional control of the pole by minimizing the effect of ABS positioning errors.

A method of forming the main pole layer will be described in a later section. First, various embodiments of a laminated main pole layer 37 according to the present invention will be described. All embodiments take advantage of a non-AFC scheme in which an amorphous material layer is inserted between two high moment layers in a plurality of stacks within the main pole layer to reduce remanence along a hard axis direction. Ideally, in a non-AFC lamination scheme, the main pole layer should have as large a magnetic moment as possible along the easy axis (Bse) and along the hard axis (Bsh) which means an amorphous material layer inserted between two high moment layers should be thin and yet able to reduce the magnetostatic coupling between neighboring high moment layers. It is well known that to effectively break the coupling of a FeCo layer, the simplest scheme is to insert a non-magnetic amorphous and heavy element layer such as Ta or Hf. However, Ta, Hf, and similar elements easily diffuse into the FeCo layer during annealing, for example, and thereby cause a substantial reduction in the magnetic moment. Therefore, the inventors were motivated to discover other amorphous materials that can be inserted in a non-AFC scheme without degrading magnetic moment but still minimizing remanance, Hc, and Hk. The following embodiments disclose various non-AFC schemes and one scheme that combines AFC and non-AFC type laminations that fulfill all these requirements. Although the exemplary embodiments show the main pole layer is formed on a RIE resistant layer 30, the advantages of the laminated main pole layer of the present invention are not limited by the absence of a RIE resistant layer. Thus, the laminated pole layer as described herein may be formed on other substrates known to those skilled in the art.

Figure 4:
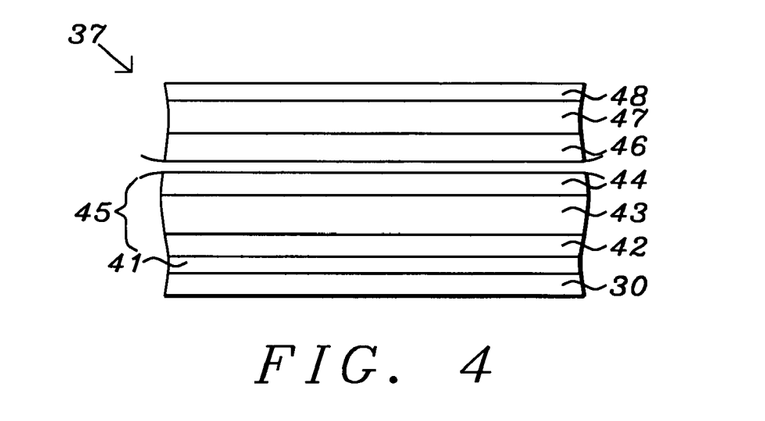
FIG. 4 is a cross-sectional view of a laminated main pole layer having a [(B/M)/A]$_n$/(B/M)/cap configuration according to a first embodiment of the present invention.

Referring to FIG. 4, a first embodiment is depicted in which the laminated main pole layer 37 has a configuration represented by seed/[(B/M)/A]$_n$/(B/M)/cap where n is an integer, A is an amorphous material layer 44, M is a high moment magnetic material such as FeCo or FeCoNi that forms the M layers 43, 47, and B is a thin layer 42, 46 that serves to control the grain growth and align the magnetic moment in an overlying M layer 43, 47, respectively. Preferably, n is from 1 to about 7 in order to keep the plurality of stacks at a size that is cost effective to manufacture. In other words, the present invention anticipates that n may be greater than 7 and provide about the same performance benefits when n is between 1 and 7. However, the process flow when n>7 may not be desirable from a throughput perspective. The cap layer 48 may be comprised of Ru with a thickness of about 50 to 250 Angstroms and can serve as a CMP stop layer on the main pole layer stack. A seed layer 41 may be employed as the bottom layer in the main pole layer structure and is formed on the RIE resistant layer 30 by a sputter deposition process or PVD method to promote the deposition of overlying layers in the main pole layer 37. Preferably, the seed layer has a face centered cubic or fcc <1,1,1> crystal structure to provide smaller coercivity. The seed layer 41 may be comprised of a composite such as Ta/NiFe having a lower Ta layer between 5 and 50 Angstroms thick and an upper NiFe layer from 5 to 50 Angstroms thick.

Total thickness of the main pole layer 37 is typically about 2 microns but the thickness may be adjusted to modify the performance of the PMR writer as appreciated by those skilled in the art. Preferably, the thickness of the M layers which comprise a majority of the main pole layer 37 is adjusted when the main pole layer design requires a thickness greater than or less than 2 microns. In one aspect, the thicknesses of the B and M layers remain constant from stack to stack. However, the present invention also encompasses an embodiment wherein the thickness of one or more of the B, M, and A layers may vary from stack to stack within the main pole layer 37.

The B layers 42, 46 may be deposited by a sputter deposition technique and may be made of NiFe, NiFeCr, or FeCoNi with a thickness of 5 to 30 Angstroms. The high moment magnetic material layers (M) 43, 47 are preferably formed by a sputter deposition method in the same sputter deposition mainframe in which the seed layer 41, cap layer 48, and B layers 42, 46 are deposited. For example, an Anelva sputter deposition system or the like that has a plurality of sputter deposition chambers and a least one oxidation chamber may be employed to deposit the seed layer 41, M layers 43, 47, and the B layers 42, 46. Note that the thickness of an M layer may vary depending upon the desired thickness of the main pole layer 37 and the number of stacks "n". For example, the stack 45 comprised of layers 42-44 may be repeated a plurality of times before the upper stack comprised of layers 46-48 is deposited. Thus, when a main pole layer thickness of about 2 microns is desired and n=7, then each of the M layers 43 in stacks 45 and the M layer 47 are about 250 Angstroms thick.

An amorphous material layer (A) 44 may be formed by first sputter depositing an element, preferably Hf, followed by a natural oxidation (NOX), radical oxidation. (ROX), or plasma oxidation process in an oxidation chamber to form HfOx, or by depositing HfOx in a sputter deposition process using an oxide target. Alternatively, the amorphous material layer 44 may be comprised of ZrOx, TaOx, AlOx, MgOx, ZnOx, SiOx, or one or more combinations of the aforementioned oxides. An amorphous material layer 44 is formed as the top layer in each stack 45 and has a thickness between 3 and 20 Angstroms, and preferably 7.5 Angstroms. There is an amorphous material layer 44 formed between each (B/M) stack in the laminated main pole layer 37 in order to break the exchange coupling between adjacent (B/M) stacks and thereby reduce the hard axis remanent magnetization (Brh) in the main pole layer.

The present invention also encompasses an embodiment wherein an amorphous material layer 44 is comprised of a nitride such as HfNx, ZrNx, TaNx, AlNx, MgNx, ZnNx, silicon nitride, or an oxynitride of Hf, Zr, Ta, Al, Mg, Zn, or Si. Furthermore, there may be an amorphous material layer 44 comprised of an oxide such as HfOx in one stack 45 and an amorphous material layer 44 made of a nitride such as HfNx in a different stack 45 within the main pole layer 37.

Figure 5:
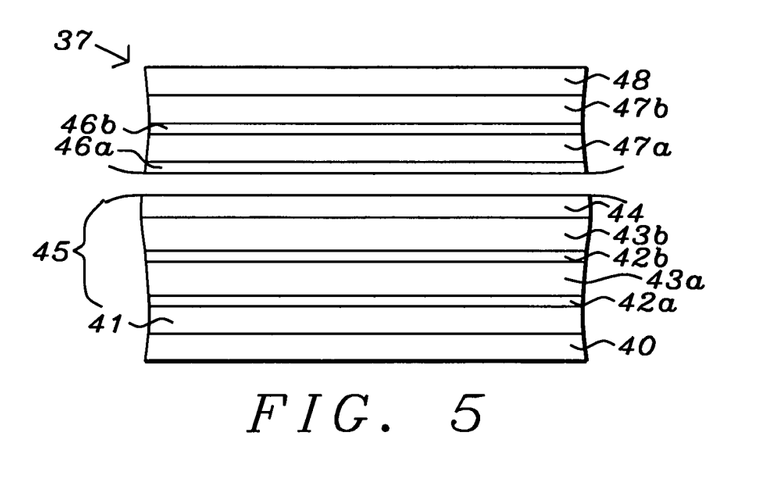
FIG. 5 is a cross-sectional view of a laminated main pole layer having a [(B/M/B/M)/A]$_n$/(B/M/B/M)/cap configuration according to a second embodiment of the present invention.

Referring to FIG. 5, a second embodiment of the present invention is illustrated wherein the laminated main pole layer 37 has a configuration represented by seed/[(B/M/B/M)/A]$_n$/(B/M/B/M)/cap where n is an integer that is preferably from 1 to about 3 and an amorphous material layer 44 is formed between the top surface in each (B/M/B/M) stack and the bottom surface in a neighboring (B/M/B/M) stack except for the uppermost (B/M/B/M) stack that has a cap layer 48 formed on the top surface (uppermost M layer). The present invention also anticipates that n may be larger than 3. However, a main pole layer 37 according to the second embodiment where n>3 may not be as desirable as a configuration in which n=1–3 from a throughput and cost effectiveness standpoint. There is a seed layer 41 formed at the bottom of the main pole layer 37, and a cap layer 48 as in the first embodiment. An important feature of the second embodiment is that a first stack 45 has a first B layer 42a, a first high moment layer 43a, a second B layer 42b, a second high moment layer 43b, and an amorphous material layer 44 are successively formed on the seed layer 41. There may be a plurality of stacks 45 wherein subsequent stacks 45 (not shown) are successively formed on the first stack 45 in a direction perpendicular to the planes of the layers in the first stack 45. At the top of the main pole layer 37 is a stack represented by (B/M/B/M)/cap formed on the uppermost amorphous material layer 44 wherein the B layers are shown as layers 46a, 46b and the M layers are depicted as layers 47a, 47b. As mentioned previously, the thickness of an M layer is dependent on the desired thickness of the main pole layer 37 and the value of "n". For example, if a main pole layer thickness of about 2 microns is desired and n=3, then the thickness of the M layers 42a, 42b, 47a, and 47b may be about 250 Angstroms. In this embodiment, an amorphous material layer 44 is employed to break the exchange coupling between neighboring (B/M/B/M) stacks and thereby reduce the hard axis remanent magnetization in the main pole layer.

Figure 6:
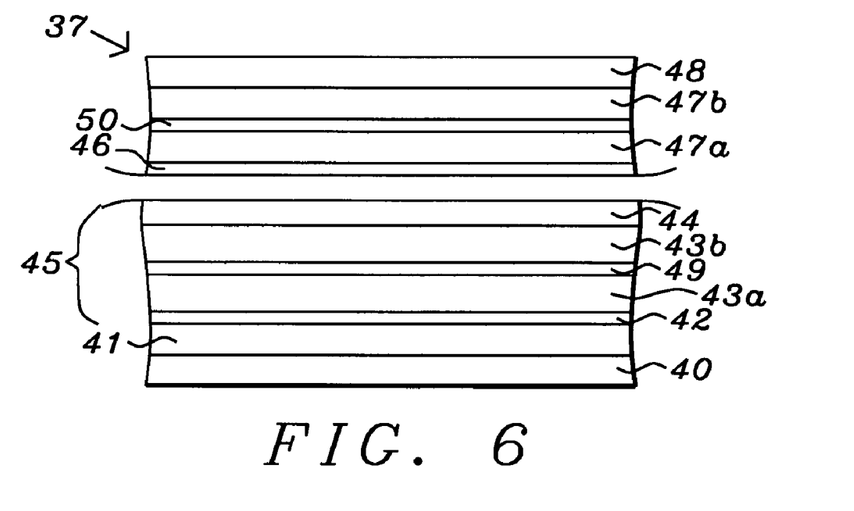
FIG. 6 is a cross-sectional view of a laminated main pole layer with a [(B/M/C/M)/A]$_n$/(B/M/C/M)/cap configuration according to a third embodiment of the present invention.

Referring to FIG. 6, a third embodiment is shown that combines the non-AFC scheme of the first two embodiments with an AFC type of lamination wherein a coupling layer (C) is used between two M layers in each stack 45 to establish an anti-ferromagnetic coupling effect within each stack 45. There is also a coupling layer (C) in the top stack to give a configuration represented by seed/[(B/M/C/M)/A]$_n$/(B/M/C/M)/cap where n is an integer from 1 to about 3 and an amorphous material layer 44 is formed as the top layer in each stack 45 that has a (B/M/C/M)/A configuration. There is a seed layer 41 formed at the bottom of the main pole layer 37, and a cap layer 48 on the uppermost stack as in the first and second embodiments. An important feature of the third embodiment is that a first stack 45 has a B layer 42, a first high moment layer 43a, a C layer 49, a second high moment layer 43b, and an amorphous material layer 44 successively formed on the seed layer 41. There may be a plurality of stacks 45 wherein subsequent stacks 45 (not shown) are successively formed on the first stack 45. At the top of the main pole layer 37 is a stack represented by (B/M/C/M)/cap wherein a B layer 46, a first M layer 47a, a C layer 50, a second M layer 47b, and cap layer 48 are sequentially formed on the uppermost amorphous material layer 44. The C layers 49, 50 may be comprised of Ru, Rh, or Ir and have a thickness between 6 and 10 Angstroms, and preferably 7.5 Angstroms. The C layers 49, 50 may be deposited by a sputter deposition process in the same sputter deposition mainframe as the seed layer 41, B layers, M layers, and cap layer 48. In this embodiment, an amorphous material layer 44 is employed to break the exchange coupling between adjacent (B/M/C/M) stacks and thereby reduce the remanent magnetization (Brh) in the main pole layer.

The process flow for forming a laminated main pole layer 37 within a mold in insulation layer 31 may be comprised of a series of sputter deposition processes to deposit the seed layer, B layers, C layer (third embodiment), and cap layer 48. In an embodiment wherein the A layer 44 is sputter deposited as an oxide, nitride, or oxynitride, all layers in the laminated main pole layer 37 may be sputter deposited within the same sputter deposition system. Optionally, the amorphous material layers 44 may be formed by a sputter deposition of an element such as Hf, Zr, Ta, Al, Mg, Zn, or Si in a sputter deposition chamber and then performing an oxidation step (ROX, NOX, or plasma oxidation) in an oxidation chamber within the same sputter deposition mainframe. After the cap layer 48 is laid down to complete the main pole layer stack, a CMP process may be employed to planarize the laminated main pole layer 37 so that the top surface of the laminated main pole layer is coplanar with the top surface of insulation layer 31. It should be understood that a portion of the cap layer 48 may be removed during the CMP step.

COMPARATIVE EXAMPLE 1

Figure 7:
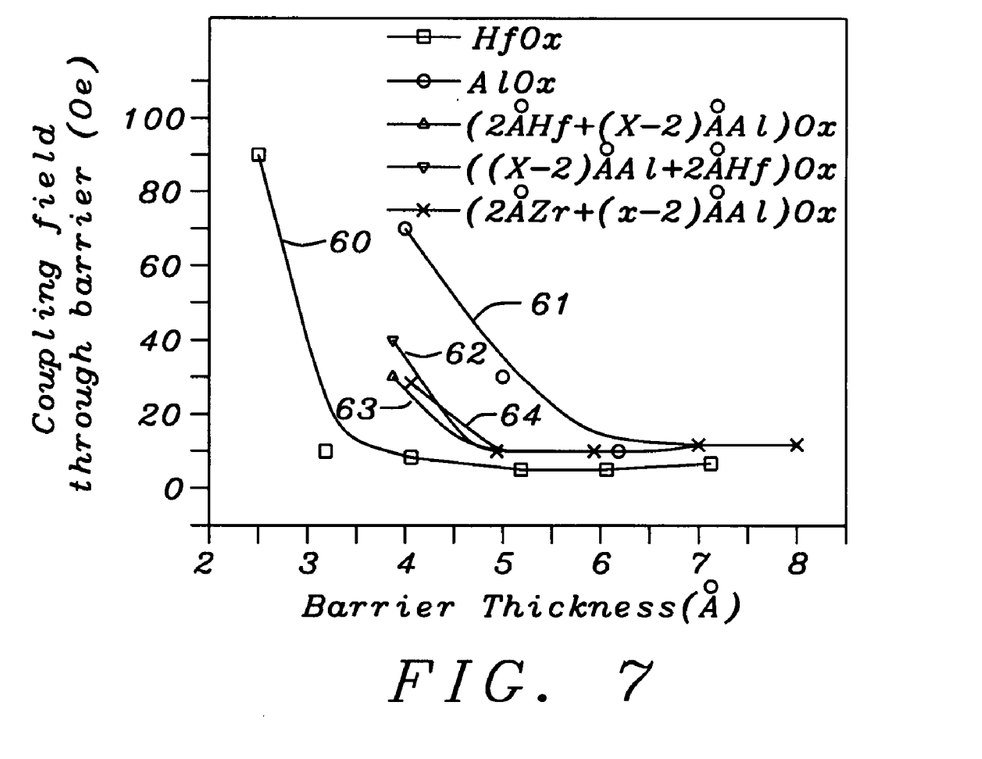
FIG. 7 is a plot that shows a coupling field through different amorphous barrier layers as a function of barrier layer thickness.

An experiment was performed to determine the relative effectiveness of various amorphous material layers in reducing the coupling field between neighboring high moment layers. In this case, a seed layer (Ta20/NiFe10) was formed on an AlTiC substrate followed by sequential formation of a first high moment layer (FeCo250), an amorphous material layer, a second high moment layer (FeCo250), and a cap layer (Ru150). Measurements were performed using a BH looper instrument. Results are depicted in FIG. 7. An amorphous material layer comprised of HfOx (curve 60) was found to provide the best results in terms of minimizing the coupling field with a thickness as low as 4 Angstroms. An amorphous material layer made of AlOx (curve 61) must be nearly twice as thick as that of HfOx to achieve the same reduction in coupling field. Composite amorphous material layers represented by AlOx/HfOx (curve 62), HfOx/AlOx (curve 63), and ZrOx/AlOx (curve 64) provide improved performance over a single layer of AlOx but are not as effective as a single layer of HfOx. Oxide layers were formed by first sputter depositing a metal layer (Hf, Zr, or Al) followed by an NOX oxidation. Composite amorphous material layer 62 was fabricated by first forming an AlOx layer by NOX oxidation of an Al layer having a (X-2) Angstrom thickness on the first FeCo layer where X is the thickness along the x-axis in FIG. 7 and then forming an HfOx layer by NOX oxidation of a Hf layer having a thickness of 2 Angstroms on the AlOx layer. Likewise, a HfOx/AlOx configuration was produced by first forming a HfOx layer by NOX oxidation of a 2 Angstrom thick Hf layer on the first FeCo layer and then forming an AlOx layer by NOX oxidation of a (X-2) Angstrom thickness of Al on the HfOx layer.

COMPARATIVE EXAMPLE 2

In a second experiment, a laminated main pole layer structure was formed as in the second embodiment with 3 stacks of [NiFe10/FeCo250/NiFe10/FeCo250/HfOx7.5] disposed on a Ta20/NiFe10 seed layer followed by an upper stack comprised of [NiFe10/FeCo250/NiFe10/FeCo250/Ru150] formed on the upper HfOx amorphous material layer. Each value next to the individual layer indicates the film thickness in Angstroms. The NiFe layers serve as alignment layers below each high moment FeCo layer while Ru is a cap layer. The performance of the laminated main pole layer is compared with that of a conventional main pole layer made of FeCo with a 2000 Angstrom thickness. According to the results in Table 1, the laminated structure of the present invention retains the high magnetic moments (Bse, Bsh) in the easy axis and hard axis directions, respectively, that is typically observed for a prior art FeCo main pole layer while yielding the desired substantial reduction in coercivity (Hce, Hch) in the easy axis and hard axis directions, respectively, as well as a large reduction in Hk and in remanence along the hard axis direction (Brh). The results shown in Table 1 were obtained before an annealing process.

TABLE 1

Comparison of magnetic properties between a single FeCo layer and a laminated film formed on a Ta/NiFe seed layer and with a Ru cap layer

| Main pole layer configuration | Bse (nW) | Bce (nW) | Hce (Oe) | Bsh (nW) | Brh (nW) | Hk (Oe) | Hch (Oe) |
|---|---|---|---|---|---|---|---|
| FeCo 2000A | 43.78 | 42.6 | 21.3 | 43.2 | 33.3 | 23.6 | 10.9 |
| [NiFe10/FeCo250NiFe10/FeCo250/HfOx7.5] × 3 NiFe10/FeCo250/NiFe10/FeCo250 | 45.7 | 42.7 | 3.2 | 43.2 | 2.4 | 14.5 | 0.6 |

In a second portion of the second experiment, a post-annealing process comprised of an easy axis anneal followed by a hard axis anneal was used to demonstrate that the anisotropy field (Hk) can be further reduced while other properties such as Bse, Bre, Hce, Bsh, Brh, and Hch are maintained. The results shown in Table 2 compare the magnetic properties of the laminated structure of the second experiment before and after the annealing process. Note that the laminated film may be anisotropic or have an essentially isotropic character in that the B-H loop (not shown) along the easy axis is similar to that along the hard axis depending on the hard axis annealing and easy axis annealing conditions, and if a combination of both annealing steps is used.

TABLE 2

Comparison of magnetic properties of the laminated film with a Ta/NiFe seed layer and a Ru cap layer before and after annealing

| Main pole layer configuration | Bse (nW) | Bce (nW) | Hce (Oe) | Bsh (nW) | Brh (nW) | Hk (Oe) | Hch (Oe) |
|---|---|---|---|---|---|---|---|
| [NiFe10/FeCo250NiFe10/FeCo250/HfOx7.5] × 3 NiFe10/FeCo250/NiFe10/FeCo250 (as deposited) | 45.7 | 42.7 | 3.2 | 43.2 | 2.4 | 14.5 | 0.6 |
| Stack shown above after annealing | 45.9 | 42.7 | 3.5 | 43.3 | 4.9 | 6.6 | 0.6 |

COMPARATIVE EXAMPLE 3

In a third experiment, a laminated main pole layer structure was formed as in the third embodiment with 3 stacks of [NiFe10/FeCo250/Ru7.5/FeCo250/HfOx7.5] disposed on a Ta20/NiFe10 seed layer followed by an upper stack comprised of [NiFe10/FeCo250/Ru7.5/FeCo250/Ru150] formed on the upper HfOx amorphous material layer. This configuration represents the third embodiment that features a combination of a non-AFC scheme using an amorphous material layer (HfOx) and an AFC scheme that has an antiferromagnetic coupling layer (Ru) formed between two FeCo layers within each (B/M/C/M) stack. In this example, the alignment layer (B) is a 10 Angstrom thick NiFe layer, the high moment (M) layers are comprised of FeCo, and the coupling layer (C) is a 7.5 Angstrom thick Ru layer. Although the results are not shown, the inventors have found the laminated main pole layer structure in this example to afford excellent magnetic properties similar to those listed in Table 2.

Thus, the inventors have demonstrated that non-AFC schemes and a combination of AFC and non-AFC schemes as described in the various embodiments of laminated main pole layers in the present invention are advantageous over prior art main pole layer structures in achieving a reduction in hard axis remanence (Brh) while maintaining a high moment necessary for high density magnetic recordings. Furthermore, the laminated main pole layers as described herein have low coercivity in the hard axis and easy axis directions as well as a low anisotropy field (Hk). A method for forming the laminated main pole layer has been described which can be readily implemented in existing manufacturing lines since all the steps may be performed within the same sputter deposition mainframe.

While this invention has been particularly shown and described with reference to, the preferred embodiment thereof, it will be understood by those skilled in the art that various changes in form and details may be made without departing from the spirit and scope of this invention.

We claim:

1. A laminated main pole layer structure, comprising:
   (a) a seed layer formed on a substrate;
   (b) a plurality of stacks each comprised of an alignment layer (B) for controlling the grain growth and magnetic moment direction in an overlying high moment magnetic layer, and the high moment magnetic layer (M) wherein the plurality of stacks each has a bottom surface and a top surface and is stacked in a direction perpendicular to the substrate and to the planes of the B and M layers;
   (c) an amorphous material layer (A) comprised of an oxide, nitride, or oxynitride of one or more of Hf, Zr, Ta, Al, Mg, Zn, or Si that is formed between the top surface of each stack and the bottom surface of a neighboring stack; and
   (d) a cap layer formed on the top surface of an uppermost stack to give a configuration represented by seed/[(B/M)/A]$_n$/(B/M)/cap where n is an integer.

2. The laminated main pole layer of claim 1 wherein the seed layer is a composite comprised of a lower Ta layer and an upper NiFe or FeCoNi layer, and the cap layer is made of Ru.

3. The laminated main pole layer of claim 1 wherein the high moment magnetic layers are comprised of FeCo or FeCoNi, and the alignment layers are comprised of NiFe, NiFeCr, or FeCoNi and each have a thickness from about 5 to 30 Angstroms.

4. The laminated main pole layer of claim 1 wherein an amorphous material layer has a thickness from about 3 to 20 Angstroms.

5. A laminated main pole layer structure, comprising:
   (a) a seed layer formed on a substrate;
   (b) a plurality of stacks each comprised of a configuration in which a first alignment layer (B layer), a first high moment magnetic layer (M layer), a second B layer, and a second M layer are sequentially formed in order from bottom to top, said plurality of stacks each has a bottom surface and a top surface and is stacked in a direction perpendicular to the substrate and perpendicular to the planes of the B and M layers;
   (c) an amorphous material layer (A) comprised of an oxide, nitride, or oxynitride of one or more of Hf, Zr, Ta, Al, Mg, Zn, or Si that is formed between the top surface of each stack and the bottom surface of a neighboring stack; and
   (d) a cap layer formed on the top surface of the uppermost stack to give a configuration represented by seed/[(B/M/B/M)/A]$_n$/(B/M/B/M)/cap where n is an integer.

6. The laminated main pole layer of claim 5 wherein the seed layer is a composite comprised of a lower Ta layer and an upper NiFe or FeCoNi layer, and the cap layer is made of Ru.

7. The laminated main pole layer of claim 5 wherein the high moment magnetic layers are comprised of FeCo or FeCoNi, and the alignment layers are comprised of NiFe, NiFeCr, or FeCoNi and have a thickness between about 5 and 30 Angstroms.

8. The laminated main pole layer of claim 5 wherein an amorphous material layer has a thickness from about 3 to 20 Angstroms.

9. A laminated main pole layer structure, comprising:
   (a) a seed layer formed on a substrate;
   (b) a plurality of stacks each comprised of a configuration in which an alignment layer (B layer), a first high moment magnetic layer (M layer), a coupling layer (C layer), and a second M layer are sequentially formed in order from bottom to top, said plurality of stacks each has a bottom surface and a top surface and is stacked in a direction perpendicular to the substrate and perpendicular to the planes of the B, C, and M layers;
   (c) an amorphous material layer (A) comprised of an oxide, nitride, or oxynitride of one or more of Hf, Zr, Ta, Al, Mg, Zn, or Si that is formed between the top surface of each stack and the bottom surface of a neighboring stack; and
   (d) a cap layer formed on the top surface of the uppermost stack to give a configuration represented by seed/[(B/M/C/M)/A]$_n$/(B/M/C/M)/cap where n is an integer.

10. The laminated main pole layer of claim 9 wherein the seed layer is a composite comprised of a lower Ta layer and an upper NiFe or FeCoNi layer, and the cap layer is made of Ru.

11. The laminated main pole layer of claim 9 wherein the high moment magnetic layers are comprised of FeCo or FeCoNi, and an alignment layers are comprised of NiFe, NiFeCr, or FeCoNi and have a thickness from about 5 to 30 Angstroms.

12. The laminated main pole layer of claim 9 wherein an amorphous material layer has a thickness from about 3 to 20 Angstroms.

13. The laminated main pole layer of claim 9 wherein the coupling layer is made of Ru, Rh, or Ir and has a thickness between about 6 and 10 Angstroms.

14. A method of forming a laminated main pole layer, comprising:

(a) forming a seed layer on a substrate;

(b) forming a plurality of stacks each comprised of at least one alignment layer (B layer) and an equal number of high moment magnetic layers (M layers) wherein the B and M layers are formed in an alternating fashion beginning with a lower B layer, and an amorphous material layer (A) comprised of an oxide, nitride, or oxynitride of one or more of Hf, Zr, Ta, Al, Mg, Zn, or Si that is formed as the top layer in each of said plurality of stacks wherein a stack has a bottom surface and a top surface and the plurality of stacks is stacked in a direction perpendicular to the substrate and perpendicular to the top and bottom surfaces of the plurality of stacks; and (c) forming an upper stack comprised of at least one B layer and an equal number of M layers formed in an alternating fashion beginning with a B layer on the uppermost A layer in the plurality of stacks, and a cap layer formed on the uppermost M layer in the upper stack to give a configuration represented by seed/[(B/M)/A]$_n$/(B/M)/cap or seed[(B/M/B/M)/A]$_n$/(B/M/B/M)/cap where n is an integer.

15. The method of claim 14 further comprised of an annealing process comprised of one or more annealing steps including a hard axis annealing step, an easy axis annealing step, or a combination of hard axis and easy axis annealing steps.

16. The method of claim 14 wherein all layers in the laminated main pole layer are formed in a sputter deposition system, said amorphous material layers are formed by sputter depositing an oxide, nitride, or oxynitride target of one or more of Hf, Zr, Ta, Al, Mg, Zn, or Si, or by sputter depositing one of Hf, Zr, Ta, Al, Mg, Zn, or Si followed by a natural oxidation (NOX), radical oxidation (ROX), or plasma oxidation process.

17. The method of claim 14 wherein an amorphous material layer has a thickness between about 3 and 20 microns, and an alignment layer is made of NiFe, NiFeCr, or FeCoNi with a thickness of about 5 to 30 Angstroms.

18. A method of forming a laminated main pole layer, comprising:

(a) forming a seed layer on a substrate;

(b) forming a plurality of stacks each comprised of an alignment layer (B layer), a first high moment magnetic layer (M layer), a coupling layer (C layer), a second M layer, and an amorphous material layer (A) comprised of an oxide, nitride, or oxynitride of one or more of Hf, Zr, Ta, Al, Mg, Zn, or Si in an order B, M, C, M, A from bottom to top wherein each stack has a bottom surface and a top surface and the plurality of stacks is stacked in a direction perpendicular to the substrate and perpendicular to the top and bottom surfaces of the plurality of stacks; and (c) forming an upper stack comprised of a B layer, a first M layer, a C layer, a second M layer, and a cap layer in an order B, M, C, M, cap from bottom to top on the uppermost amorphous material layer to give a configuration represented by seed/[(B/M/C/M)/A]$_n$/(B/M/C/M)/cap where n is an integer.

19. The method of claim 18 further comprised of an annealing process comprised of one or more annealing steps including a hard axis annealing step, an easy axis annealing step, or a combination of hard axis and easy axis annealing steps.

20. The method of claim 18 wherein all layers in the laminated main pole layer are formed in a sputter deposition system, said amorphous material layers are formed by sputter depositing an oxide, nitride, or oxynitride target of one or more of Hf, Zr, Ta, Al, Mg, Zn, or Si, or by sputter depositing one of Hf, Zr, Ta, Al, Mg, Zn, or Si followed by a natural oxidation (NOX), radical oxidation (ROX), or plasma oxidation process.

21. The method of claim 18 wherein an amorphous material layer has a thickness between about 3 and 20 microns, an alignment layer is made of NiFe, NiFeCr, or FeCoNi with a thickness of about 5 to 30 Angstroms, and a coupling layer is made of Ru, Rh, or Ir and has a thickness between about 6 and 10 Angstroms.

* * * * *